_(12)_ United States Patent
Takahashi et al.

(10) Patent No.: US 8,139,324 B2
(45) Date of Patent: Mar. 20, 2012

(54) MAGNETIC READ HEAD HAVING A NON-MAGNETIC ELECTRODE LAYER AND A MAGNETIC READ WRITE SYSTEM

(75) Inventors: Hiromasa Takahashi, Hachioji (JP); Masaki Yamada, Sendai (JP)

(73) Assignee: Hitachi, Ltd., Tokyo (JP)

( * ) Notice: Subject to any disclaimer, the term of this patent is extended or adjusted under 35 U.S.C. 154(b) by 759 days.

(21) Appl. No.: 11/984,377

(22) Filed: Nov. 16, 2007

(65) Prior Publication Data

US 2008/0176107 A1    Jul. 24, 2008

(30) Foreign Application Priority Data

Jan. 24, 2007  (JP) ................................. 2007-013816

(51) Int. Cl.
 *G11B 5/39* (2006.01)
(52) U.S. Cl. .............................. 360/324.12; 360/324.11
(58) Field of Classification Search .......... 360/313–322, 360/324–327
See application file for complete search history.

(56) References Cited

U.S. PATENT DOCUMENTS

| | | | | |
|---|---|---|---|---|
| 5,701,222 A | * | 12/1997 | Gill et al. ...................... | 360/314 |
| 6,219,212 B1 | * | 4/2001 | Gill et al. ................... | 360/324.2 |
| 6,757,144 B2 | * | 6/2004 | Carey et al. ................ | 360/324.2 |

OTHER PUBLICATIONS

Jedema, F. J. et al, "Electrical detection of spin precession in a metallic mesoscopic spin valve", Letters to the Editor, Nature, vol. 416, Apr. 18, 2002, pp. 713-716.
Brataas, Arne et al., "Spin accumulation in small ferromagnetic double-barrier junctions", Physical Review B, vol. 59, No. 1, Jan. 1, 1991, pp. 93-96.
Heide, C., "Effects of spin accumulation in magnetic multilayers", Physical Review B, vol. 65, 2001, pp. 054401-1 through 054401-17.

* cited by examiner

*Primary Examiner* — Craig A. Renner
*Assistant Examiner* — Gustavo Polo
(74) *Attorney, Agent, or Firm* — Stites & Harbison PLLC; Juan Carlos A. Marquez, Esq.

(57) ABSTRACT

To provide a magnetic head that is suited for high recording density magnetic read and write, and has little noise. A magnetic pinned layer is formed on a non-magnetic electrode layer via a first insulating layer, and a magnetic free layer is formed on a medium-side plane of the non-magnetic electrode layer via a second insulating layer. A circuit for flowing current between the non-magnetic electrode layer and the magnetic pinned layer via the first insulating layer, and a circuit for measuring voltage between the non-magnetic electrode layer and the magnetic free layer are connected to the magnetic free layer. The medium-side plane on which the magnetic free layer is formed may be a plane substantially parallel to the surface of the medium, or may be a plane tilted from the surface of the medium.

9 Claims, 15 Drawing Sheets

FIG. 11 A
FIG. 11 B
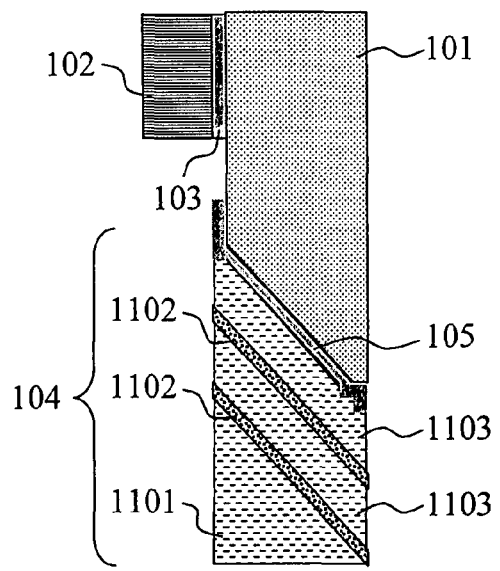
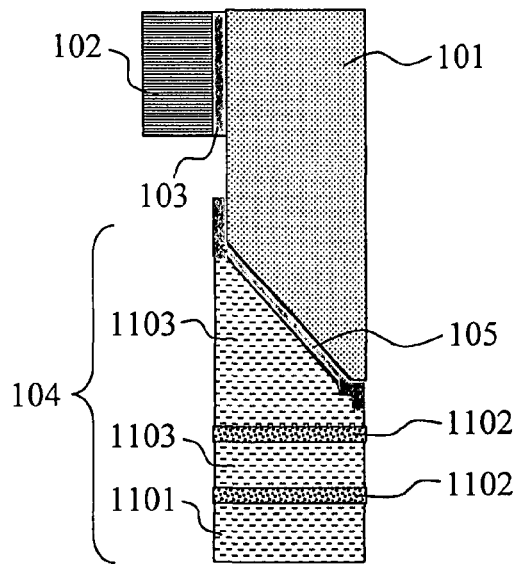

MAGNETIC READ HEAD HAVING A NON-MAGNETIC ELECTRODE LAYER AND A MAGNETIC READ WRITE SYSTEM

CLAIM OF PRIORITY

The present application claims priority from Japanese application JP 2007-013816 filed on Jan. 24, 2007, the content of which is hereby incorporated by reference into this application.

BACKGROUND OF THE INVENTION

1. Field of the Invention

The present invention relates to a magnetic read head and magnetic read write system equipped with a magnetoresistive element.

2. Background Art

In the market of magnetic read write systems, the improvement of recording density exceeding the annual rate of 40% has been required, and also in corresponding magnetic read write heads, the improvement of performance for both read and write functions has been required. Among these, it is important for magnetic read heads to satisfy three technical problems: the improvement of sensitivity elevating technology, the improvement of track width reducing technology, and the improvement of read gap distance reducing technology.

In recent years, studies and device development related to the exchange effect between spin-polarized current and magnetization have been actively carried out. For example, as described in "Electrical Detection of Spin Procession in a Metallic Mesoscopic Spin Valve", F. J. Jedema et al., NATURE, Vol. 416, pp 713-716, 18 April 2002, it has been confirmed that a spin current having a polarized spin polarizability in conducted for a distance as long as 100 nm or more to cause a magnetic exchange effect. They prepared thin Co wires having different thicknesses and thin Al wires orthogonal thereto, and fabricated a structure wherein an alumina barrier layer was formed on the location where a thin Co wire intersects with a thin Al wire. At this time, when a current was flowed from a thick Co wire to an Al wire and a magnetic field was supplied to the film, a potential difference depending of the magnetic field occurred between the Co wires and Al wires wherein no current was flowed, and even if the distance between these thin wires exceeded 500 nm, a magnetic exchange effect was observed. This has been theoretically recognized as described in, for example, Physical Review B, Vol. 59, No. 1, pp 93-97 and Physical Review B, Vol. 65 054401, pp 1-17, as the effect when spin polarized electrons are accumulated in the boundary portion of the thin Al wire, and occurs when the accumulated spin polarized electrons are distributed into a wide region in the thin wires.

In general, such elements are characterized in that if there are two magnetic bodies having different coercivity from an external magnetic field, change in potential of a magnetic body to the conductor is created as an output; and the potential is characterized in that the potential has different polarity depending on whether the magnetization of the two magnetic bodies are parallel or antiparallel. In the above-described structure, the magnetic body consists of simple Co, which is connected to Al. Even in this structure, output with changing in magnetic field can be obtained at normal temperature.

| [Non-Patent Document 1] | NATURE, Vol. 416, pp 713-716, 18 Apr. 2002 |
| [Non-Patent Document 2] | Physical Review B, Vol. 59, No. 1, pp 93-96 |
| [Non-Patent Document 3] | Physical Review B, Vol. 65 054401, pp 1-17 |

SUMMARY OF THE INVENTION

In order to actually apply a device utilizing the exchange effect of spin polarized current to a head, it is important to reduce noise related to the device. Normally, examples of noise in a magnetic sensor include Johnson noise caused by heat, shot noise produced when electrons tunnel the barrier, and magnetic noise produced following magnetization inversion at high frequencies. Since Johnson noise is related to element resistance, and has small frequency dependence and a small value, it is common to any devices as white noise. Since the device is basically equipped with a barrier layer in the current path, it is estimated to be affected by shot noise as in TMR. In particular, it is considered that the portions where current directly flows function as a noise source. For magnetic noise, since it is produced by the correlation between the use of a magnetic body and the volume reduction due to miniaturization, it is required as countermeasures to use no magnetic bodies or to maintain the volume of the element in at least a certain volume even the density is elevated.

It is an object of the present invention to select an element structure suited to the realization of such characteristics and to provide a magnetic sensor and a magnetic read-write head having larger outputs than outputs by conventional systems.

In the present invention, a magnetic body constituting a magnetic free layer is formed on the end surface of a non-magnetic electrode layer wherein spin polarized electrons are accumulated facing a medium. By this element structure, the volume of the magnetic body constituting the magnetic free layer can be maintained to be at least a certain volume even if the read gap distance is narrowed, and magnetic noise can be suppressed.

A magnetic read head of the present invention comprises a non-magnetic electrode layer, a magnetic pinned layer formed on the non-magnetic electrode layer via a first insulating layer, a magnetic free layer formed on the medium-side surface of the non-magnetic electrode layer via a second insulating layer, a circuit for flowing current between the non-magnetic electrode layer and the magnetic pinned layer via the first insulating layer, and a circuit for measuring voltage between the non-magnetic electrode layer and the magnetic free layer. The medium-side surface on which a magnetic free layer is formed may be a plane substantially parallel to the surface of the medium, or may be a plane tilted from the surface of the medium.

According to the present invention, a magnetic read head wherein element resistance can be more easily controlled than conventional magnetic read heads, a magneto resistive ratio is high, effective to elevating resolution power, and having large output can be obtained. By using such a magnetic read head, a magnetic read-write system having a surface recording density exceeding 1000 Gb/in$^2$ can be realized.

BRIEF DESCRIPTION OF THE DRAWINGS

FIGS. 11A and 11B are diagrams showing the stacking structures of magnetic free layers;

DETAILED DESCRIPTION OF THE PREFERRED EMBODIMENTS

A magnetic read head according to the present invention will be described in detail.

Figure 1:
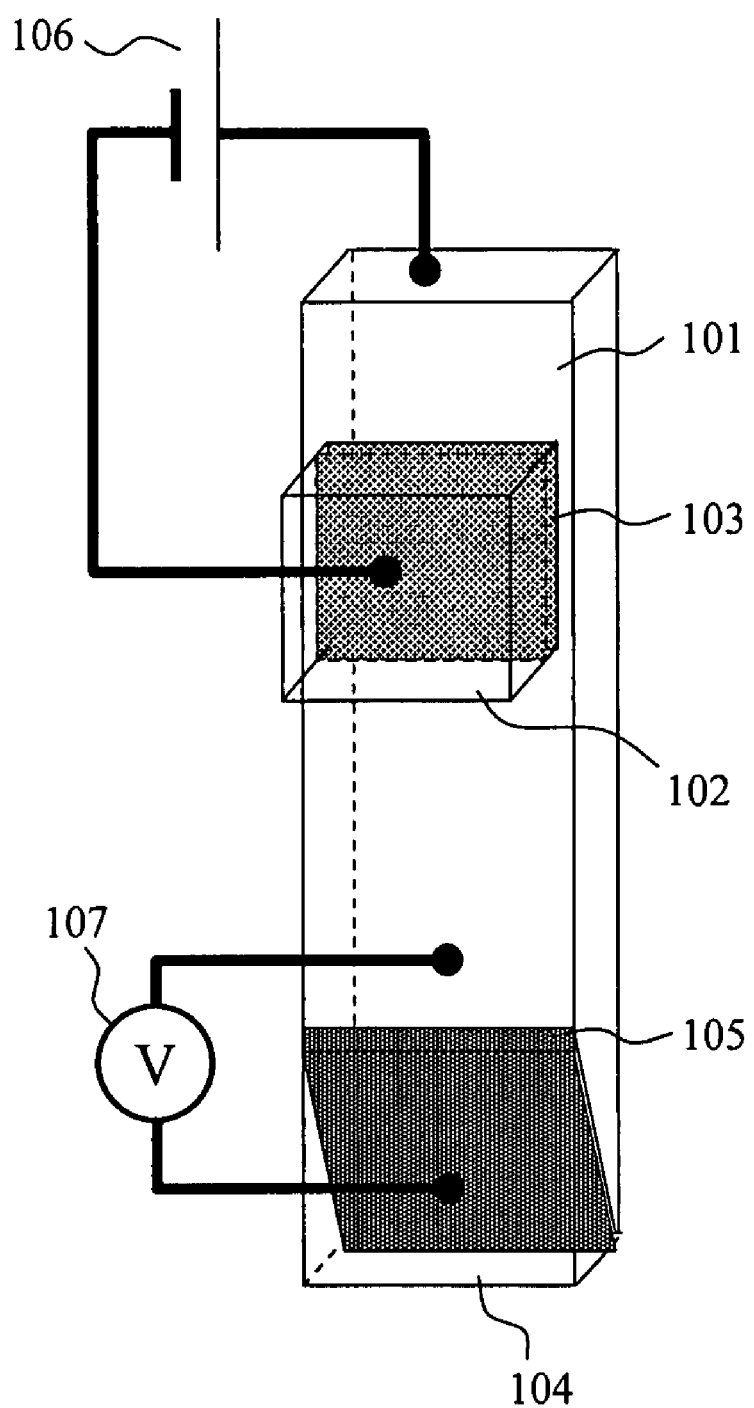
FIG. 1 is a schematic diagram showing a basic device structure of the present invention.

FIG. 1 is a schematic diagram showing a basic device structure of the present invention. The element has a structure wherein a linear non-magnetic electrode layer 101 contacts a magnetic pinned layer 102, which is a first magnetic body, via a first insulating layer 103 formed on the non-magnetic electrode layer 101; and in another location of the non-magnetic electrode layer 101, a magnetic free layer 104, which is a second magnetic body, contacts the non-magnetic electrode layer 101 via a second insulating layer 105. A current source 106 is connected to the magnetic pinned layer 102 and the non-magnetic electrode layer 101 to flow current passing through the magnetic pinned layer 102 and the non-magnetic electrode layer 101. A circuit 107 for measuring potential difference between the magnetic free layer 104 and the non-magnetic electrode layer 101 is also connected.

The structural characteristics of the element according to the present invention is that the first insulating layer 103 and the second insulating layer 105 are not formed on the different locations on the same surface of the film constituting the non-magnetic electrode layer 101, but the second insulating layer 105 and the magnetic free layer 104 formed on the film is disposed on a sectional location formed by processing the non-magnetic electrode layer 101, as shown in FIG. 1. Thereby, the size of the magnetic free layer 104 can be extended not only in the film thickness direction, but also in the element height direction, and the effective volume of the magnetic free layer 104 can be expanded to reduce magnetic noise caused by thermal magnetic fluctuation.

Figure 2:
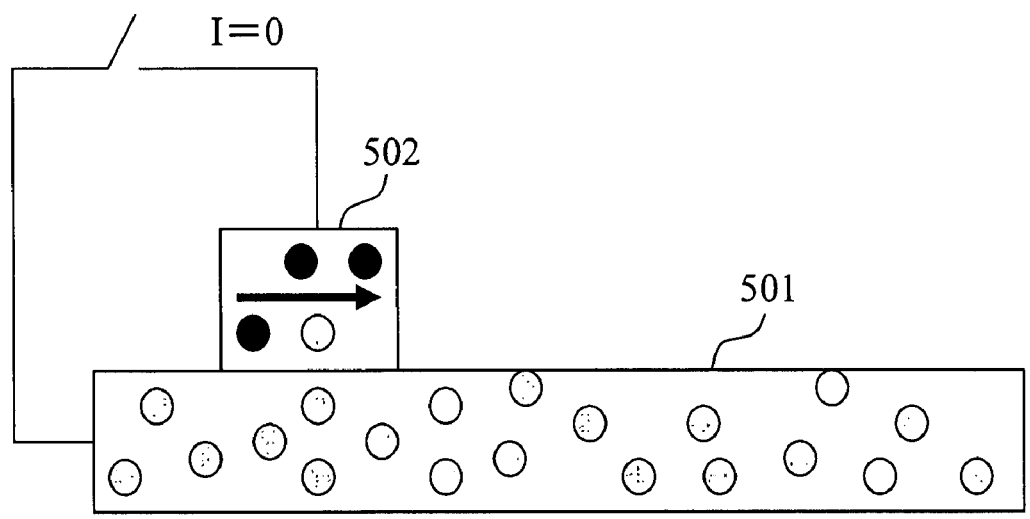
FIGS. 2A and 2B are diagrams showing the principle of spin accumulation phenomenon.
Figure 2:
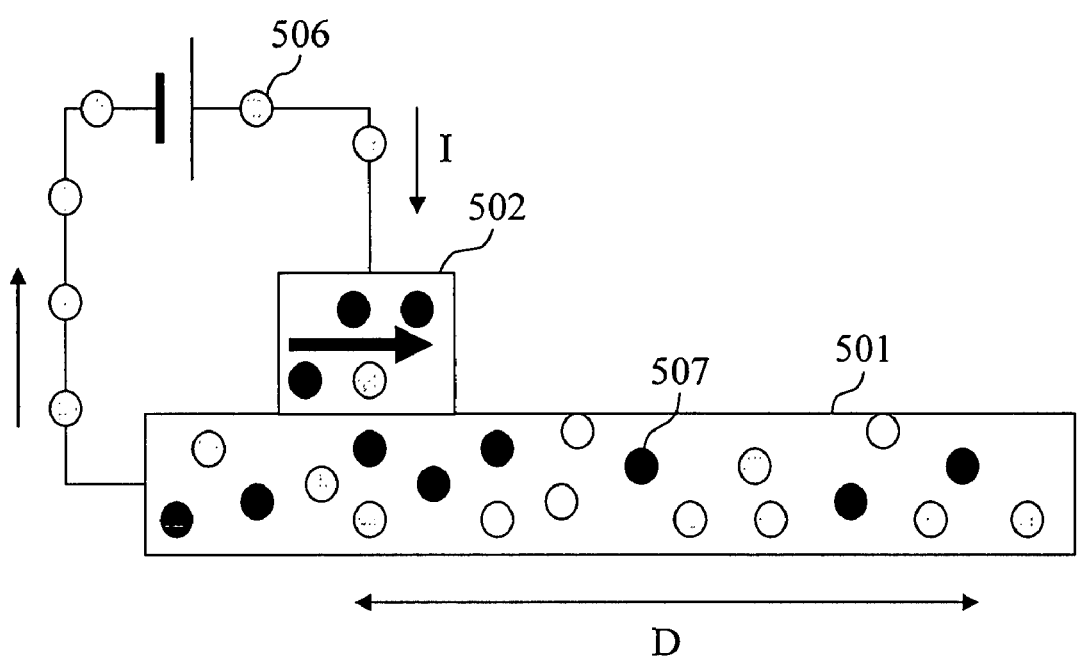

The device applies a spin accumulation phenomenon as the principle of operation. The principle will be briefly described. In a structure wherein a magnetic body 502 magnetized in the arrow direction contacts the non-magnetic body 501 as shown in FIG. 2A, if no current is flowed, free electrons without spin polarization are present in the non-magnetic body 501. However, when current is flowed through the interface as shown in FIG. 2B, electrons (charge current) 506 flow in the circuit, and separately, spin electrons 507 having magnetic information stay on reaching the interface and accumulate throughout a wide region in the non-magnetic body 501. This is the spin accumulation phenomenon. The size D of the region where the spin electrons spread is correlated to a constant known as s spin diffusion length of the material, and is determined by the material, purity and crystal structure of the non-magnetic body 501. For example, in copper and aluminum in an ideal state, D reaches about 1 μm.

Figure 3:
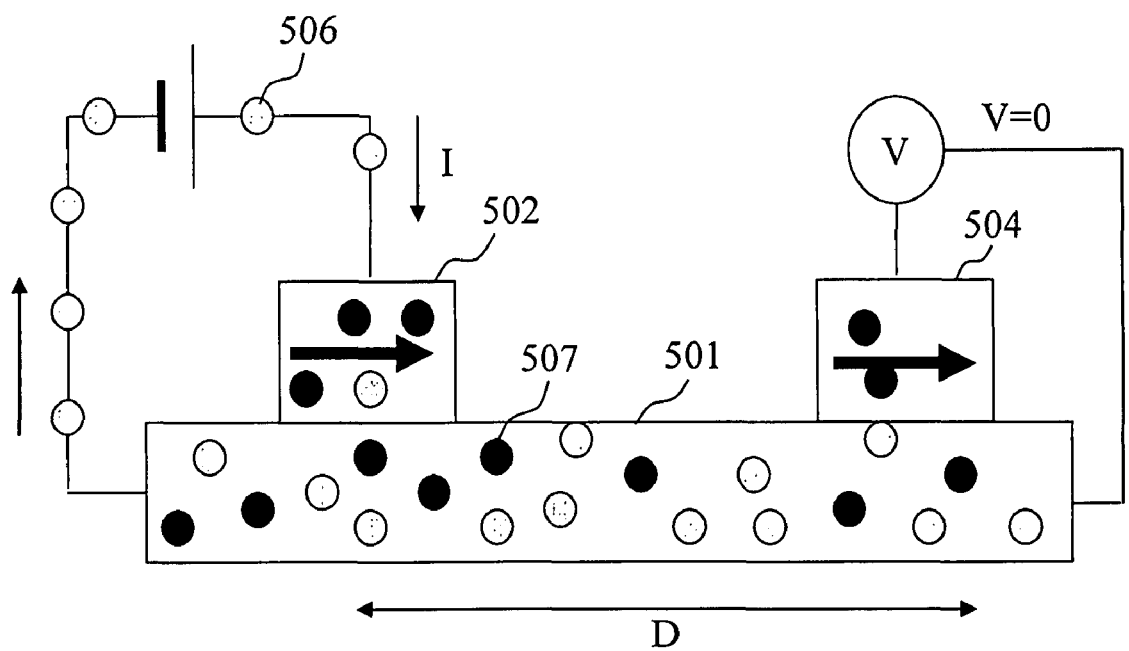
FIGS. 3A and 3B are diagrams showing the principle of sensing by spin accumulation phenomenon.
Figure 3:
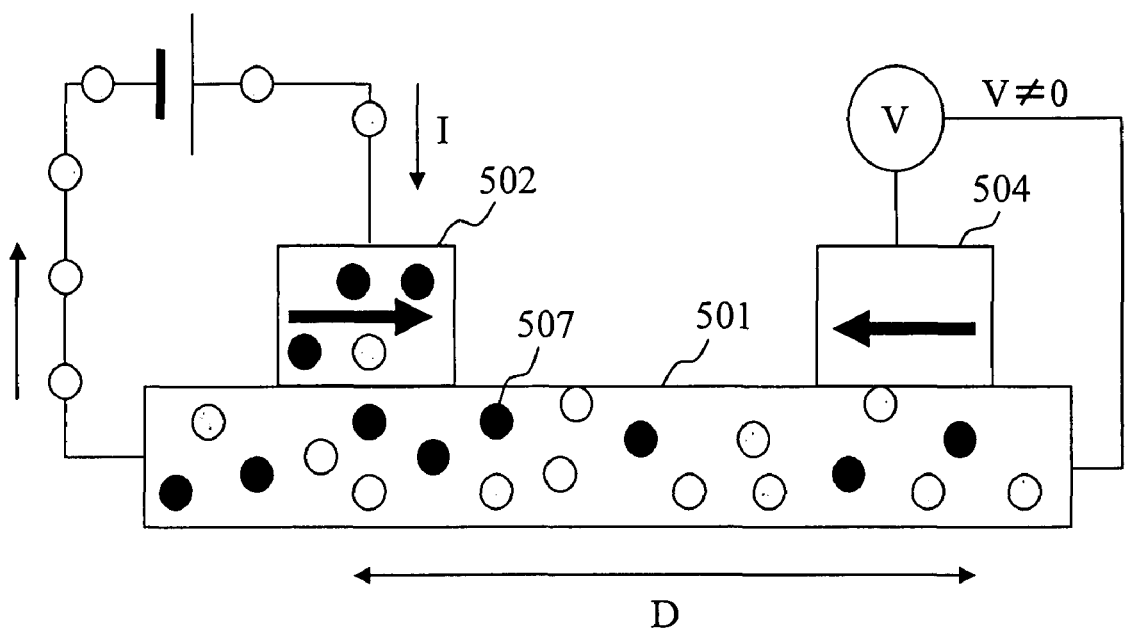

Here, as shown in FIG. 3A, another magnetic body 504 is contacted with the non-magnetic body 501 in the state wherein current is flowed in the circuit. At this time, the charge current 506 does not flow from the non-magnetic body 501 toward the magnetic body 504. When the magnetization direction of the magnetic body 504 is the same as the magnetization direction of the magnetic body 502 as shown in FIG. 3A, the spin electrons 507 accumulated in the non-magnetic body 501 can enter into the magnetic body 504. Since this state means the electrically conducting state, both magnetic bodies have substantially the same potential. On the other hand, when the magnetization direction of the magnetic body 504 is opposite to the magnetization direction of the magnetic body 502 as shown in FIG. 3B, the spin electrons 507 accumulated in the non-magnetic body 501 are reflected at the boundary to the magnetic body 504, and cannot enter into the magnetic body 504. This means an electrically insulated state, and a potential difference equivalent to the difference of chemical potential is produced between both magnetic bodies. If this potential difference is considered as an electric signal, the structure as a magnetic read head can be constituted by making each of the magnetic body 502 and the magnetic body 504 have a magnetic function such as a magnetic pinned layer and a magnetic free layer of a normal spin valve film respectively. By this phenomenon, spin information produces an exchange effect as magnetic resistance even in a remote location exceeding 500 nm in a non-magnetic electrode material having a large spin diffusion length, and when the distance is short, the exchange effect is strengthened, and the output signal is also exponentially enlarged.

Figure 4:
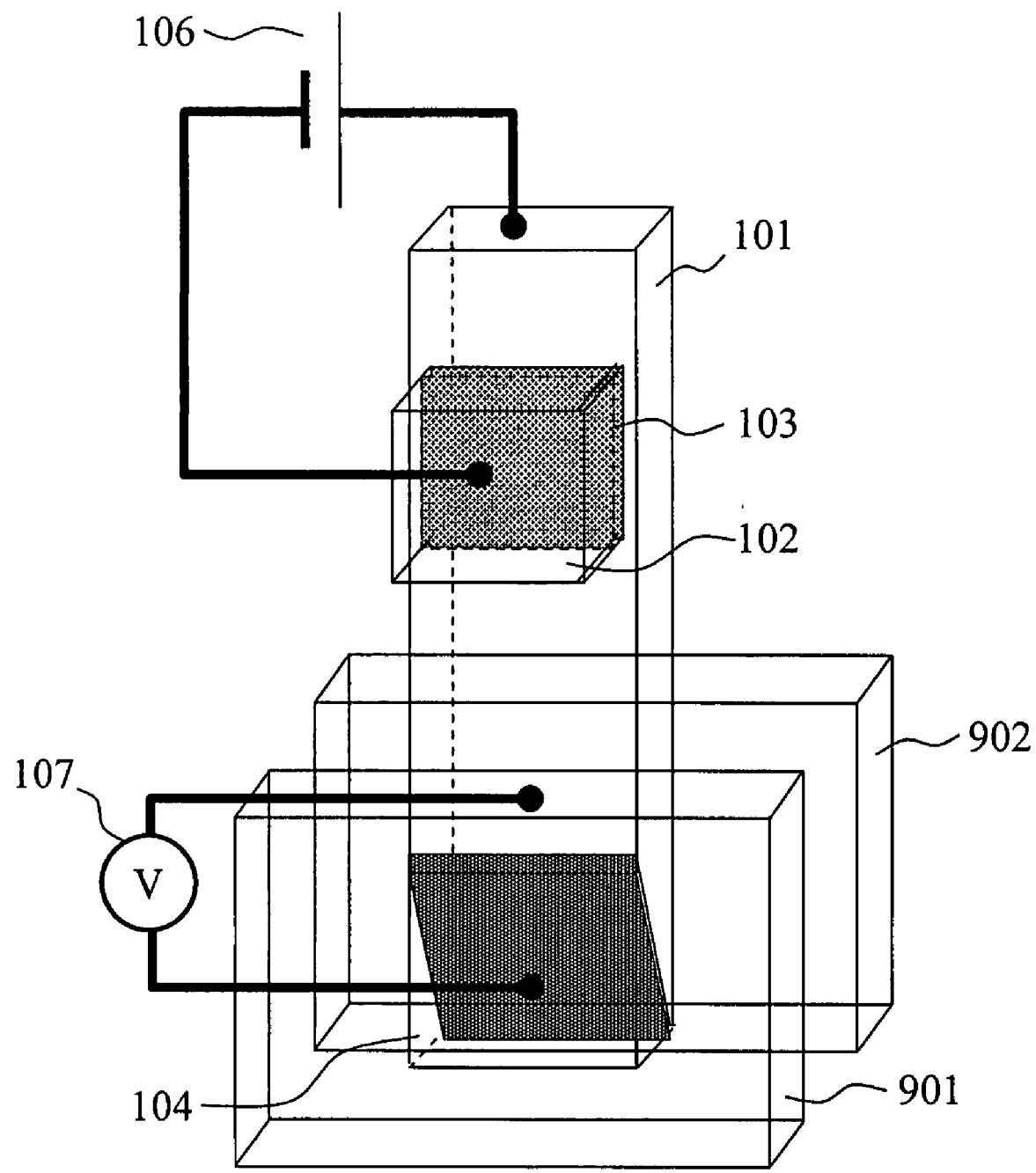
FIG. 4 is a schematic diagram showing a reading head structure of the present invention.

Here, the behavior of a device according to the present invention and the mechanism of effect producing will be described. As described above, the magnetic read head of the present invention is composed of a magneto-resistive element of spin current utilizing the accumulation effect of the spin current. The magneto-resistive element of spin current utilizing the accumulation effect of the spin current has a mechanism to convert change in the magnetic field generated from the recording medium into a voltage change signal and to obtain the signal as an output. In the magnetic pinned layer 102, a ferromagnetic layer and an antiferromagnetic layer are laminated for fixing magnetization, and the magnetization of the ferromagnetic layer is fixed to one direction by antiferromagnetic coercive force. Alternatively, a high coercive force is provided by controlling shape magnetic anisotropy or crystalline magnetic anisotropy using a method to change the shape by changing the film thickness or line width, or to use different materials in magnetic bodies. The magnetic free layer 104 has a multilayer structure using plural kinds of materials for maintaining single magnetic domain state, or has a structure to supply bias magnetic field using static magnetic coupling by forming a permanent magnetic film via a non magnetic film (closed flux structure). Around the magnetic free layer, soft magnetic layers 901 and 902 having magnetic shield function for preventing the external magnetic field effects as shown in FIG. 4 are provided. The shield films have adequate soft magnetism, and prevent external disturbance such as crosstalk. In the example shown in FIG. 4, although the magnetic shield is disposed above and below the film thickness direction of the device film, if the magnetic shield has the shape to surround the device called surrounding type shield, the shielding effect is more effective.

Figure 5:
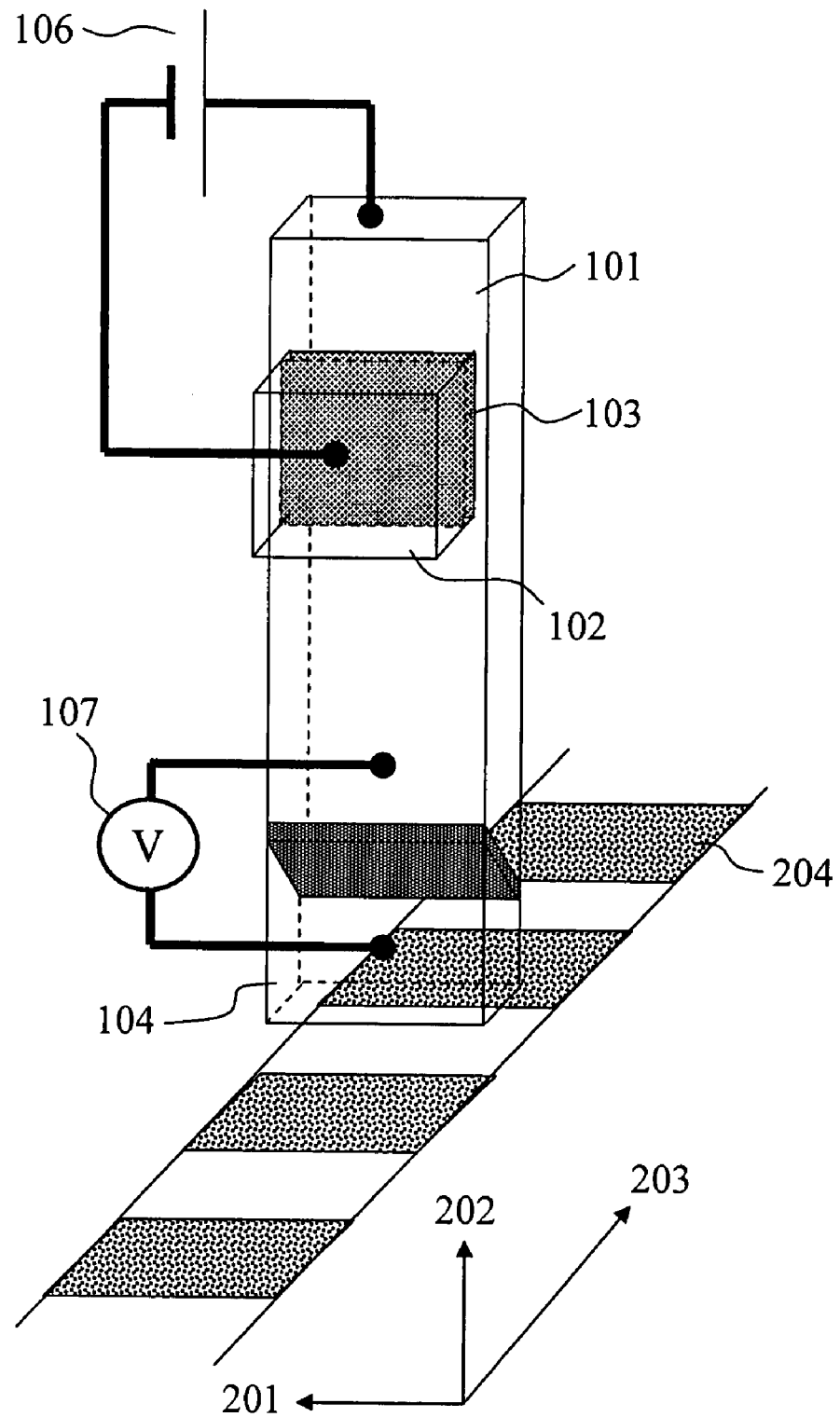
FIG. 5 is a schematic diagram showing the relation between the major part of the sensor of the present invention and the medium.
Figure 6:
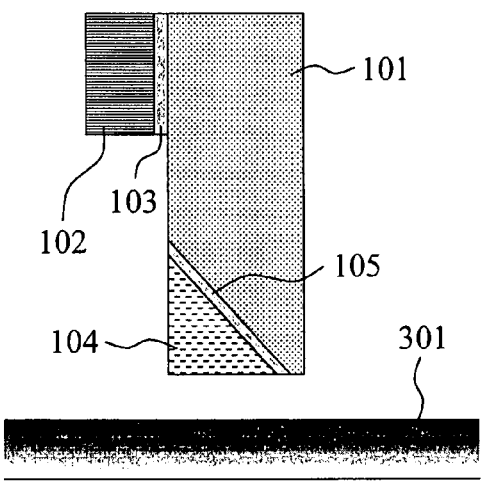
FIGS. 6A to 6E are sectional views showing the structure of the major part of the sensor of the present invention.
Figure 6:
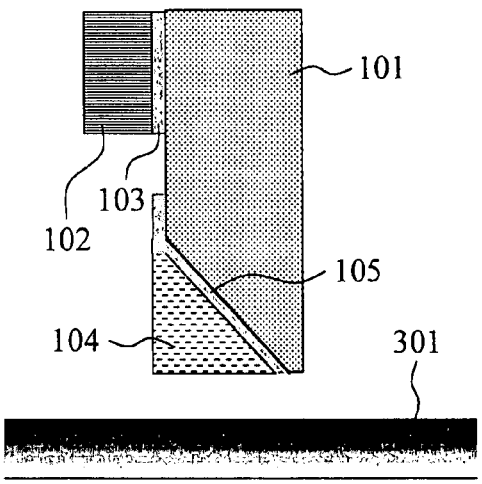
Figure 6:
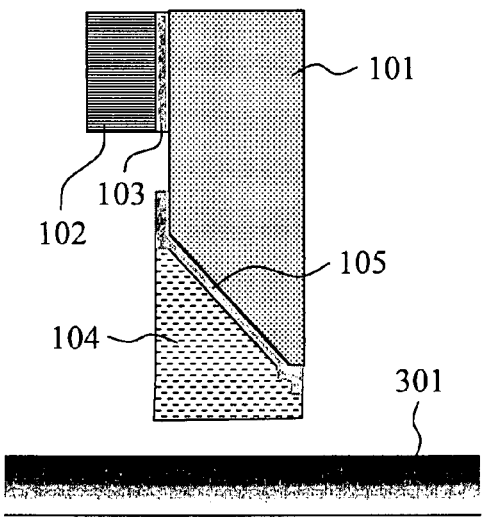
Figure 6:
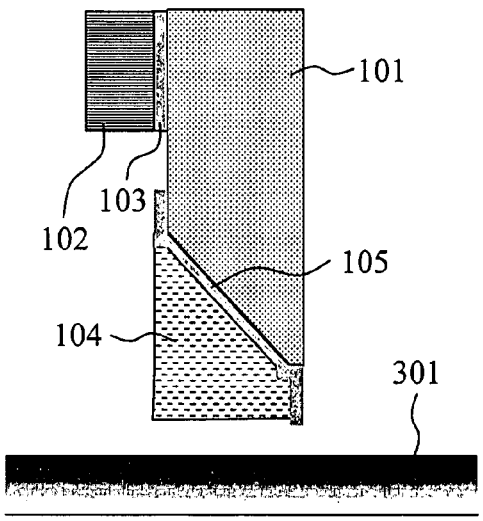
Figure 6:
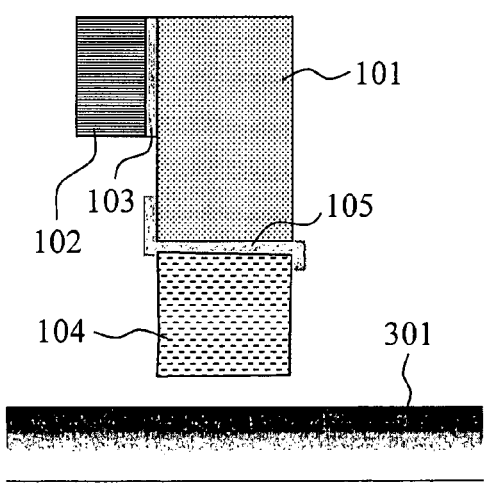

The positional relation between the sensor structure and the recording medium is shown in FIG. 5. In FIG. 5, a magnetic shield and the like are not shown. The magnetic free layer 104 is disposed in the location closest to the medium surface, and the direction of magnetization is changed by the effect of the recording magnetic field from recording information 204. Here, the shape of the medium and the recording system are not specifically limited. The present invention can be applied to any of vertical recording, in-plane recording, discrete track media, and pattern recording. Here, the track-width direction is denoted by 201, the device-height direction is denoted by 202, and the film-thickness direction is denoted by 203.

FIGS. 6A to 6E are diagrams showing structural examples of the cross-section along the device-height direction at the center of the thin wire width of the non-magnetic electrode layer 101 shown in FIG. 5. The numeral 301 denotes the surface of the medium. FIG. 6 mainly shows the cross-sectional structures of the second insulating layer 105 and the magnetic free layer 104.

FIG. 6A is a diagram showing a structure wherein the end portion of a non-magnetic electrode layer 101 is diagonally scraped, on which a second insulating layer 105 and a magnetic free layer 104 are formed as shown in FIG. 1. In every structure example shown in FIGS. 6A to 6D, although a plane forming a second insulating film is formed on the non-magnetic electrode layer 101 in a diagonal angle against the device-height direction, the second insulating film may be formed on the plane of the non-magnetic electrode layer 101 substantially perpendicular to the device-height direction as shown in FIG. 6E. FIGS. 6B and 6D show representative examples for the locations on which the second insulating layer 105 is formed. FIG. 6C shows an example wherein the length of the magnetic free layer 104 in the medium-surface direction is extended. In any of the structure examples, a magnetic free layer 104 is formed on the end plane facing the medium of the non-magnetic electrode layer 101 via a second insulating layer 105.

FIGS. 7A to 7D are diagrams showing examples of the structure of a device viewed from the above of the device shown in FIG. 5 (the direction of 203). A magnetic shield is not shown. FIGS. 7A to 7D also show mainly the arrangement of the second insulating layer 105 and the magnetic free layer 104.

Figure 7:
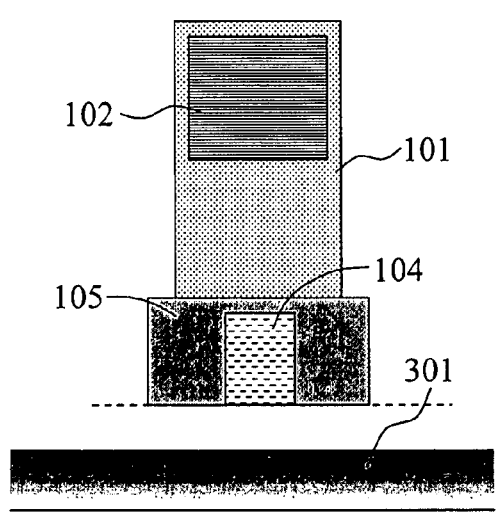
FIGS. 7A to 7D are plan views of a read head structure showing the arrangement of the second insulating layer and the magnetic free layer.
Figure 7:
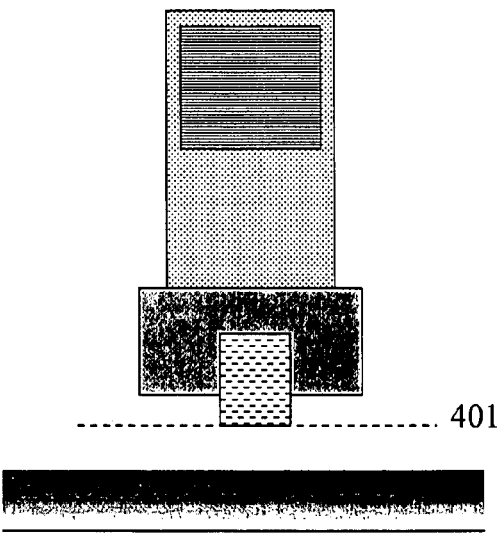
Figure 7:
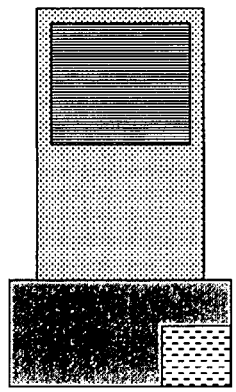
Figure 7:
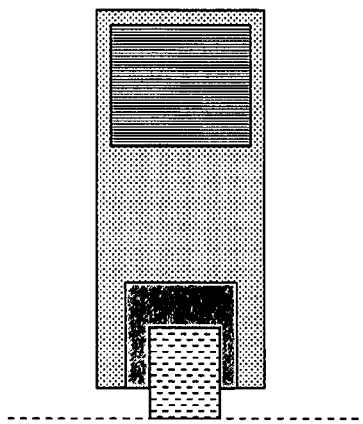
Figure 8:
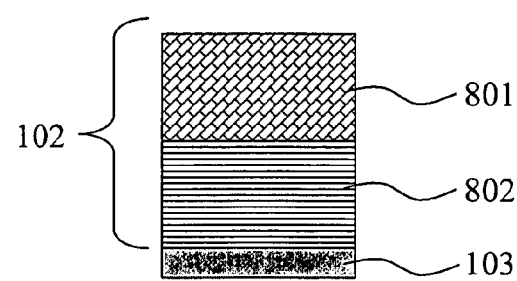
FIG. 8 is a diagram showing an example of the structure of a magnetic pinned layer.

FIG. 7A shows a structure wherein the linear width of a second insulating layer 105 is larger than the linear width of a non-magnetic electrode layer 101, and the height location of a plane of a magnetic free layer 104 facing a medium substantially agrees with the height location of the non-magnetic electrode layer 101. FIG. 7B shows a structure wherein the height location of a plane of a magnetic free layer 104 facing a medium is protruded from the height location of the non-magnetic electrode layer 101. FIG. 7D shows a modified example of the area of a second insulating layer 105 wherein the width of the second insulating layer 105 in the track width direction is smaller than the linear width of the non-magnetic electrode layer 101. FIG. 7C shows a modified example of the positional relation between a magnetic free layer 104 and the non-magnetic electrode layer 101 wherein the magnetic free layer 104 is disposed in a location deviated from the center of the non-magnetic electrode layer 101 in the track direction. In the drawings, the reference numeral 401 denotes a plane facing the medium of a head, and the periphery of the magnetic free layer 104 is coated with an insulating protective film or the like. The reference numeral 301 denotes the surface of the medium. The detailed film structure of the magnetic pinned layer 102 is not shown, but the magnetic pinned layer 102 is shown as a simple magnetic layer. The magnetic pinned layer 102 include a laminated structure of antiferromagnetic bodies 801 and magnetic bodies 802, and a structure formed by further laminating such laminated structures. However, even a structure using a single layer magnetic bodies 802 formed of a material having a high coercive force, such as FePt, and omitting the antiferromagnetic bodies 803 can also constitute the first magnetic layer.

Figure 9:
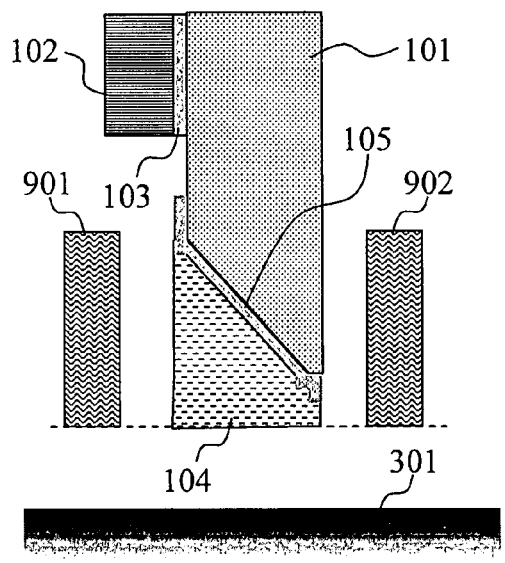
FIGS. 9A to 9C are schematic diagrams showing examples of the positional relation between a magnetic shield and sensor elements.
Figure 9:
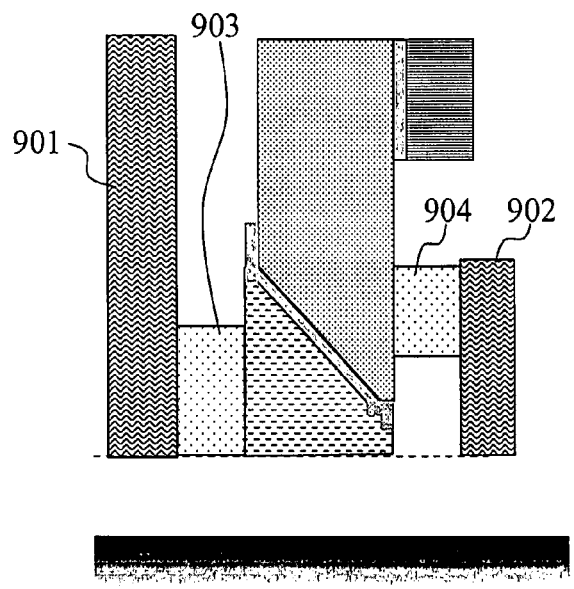
Figure 9:
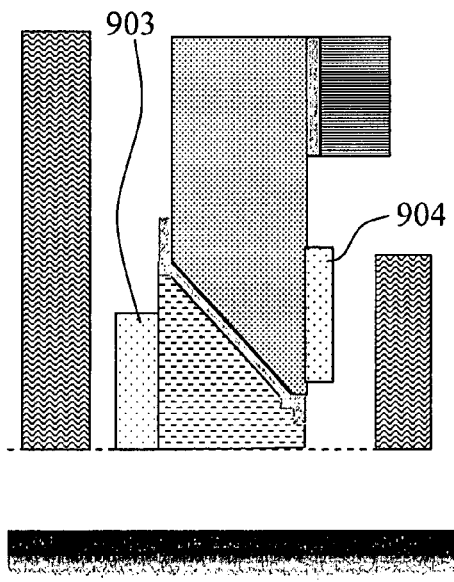

FIGS. 9A to 9C are schematic diagrams showing examples of the positional relation between a magnetic shield and sensor elements. A specific read head has a cross-sectional shape as shown in FIGS. 9A to 9C. These are represented by the device structure shown in FIG. 7C, and soft magnetic layers 901 and 902 having magnetic shield function are disposed above and below the film-thickness direction thereof. FIG. 9A shows a structure wherein the soft magnetic layers 901 and 902 are independent from a potential difference measuring circuit 107 of the magnetic free layer 104. At this time, each of electrodes electrically connected to the magnetic free layer 104 and the non-magnetic electrode layer 101 is substantially disposed in the top and the bottom directions of the page. Although the soft magnetic layers 901 and 902 are disposed only around the magnetic free layer 104 in FIG. 9A, these may be extended to coat the magnetic pinned layer 102. FIG. 9B shows a structure wherein the soft magnetic layers 901 and 902 are electrically connected to the magnetic free layer 104 and the non-magnetic electrode layer 101, respectively. FIG. 9C shows a variation of the structure shown in FIG. 9A, and is a structure wherein the cross sections of electrode films 903 and 904 extending in the top and the bottom directions of the page can be seen. The space around electrically conductive films is adequately filled by insulating protective films or the like.

Figure 12:
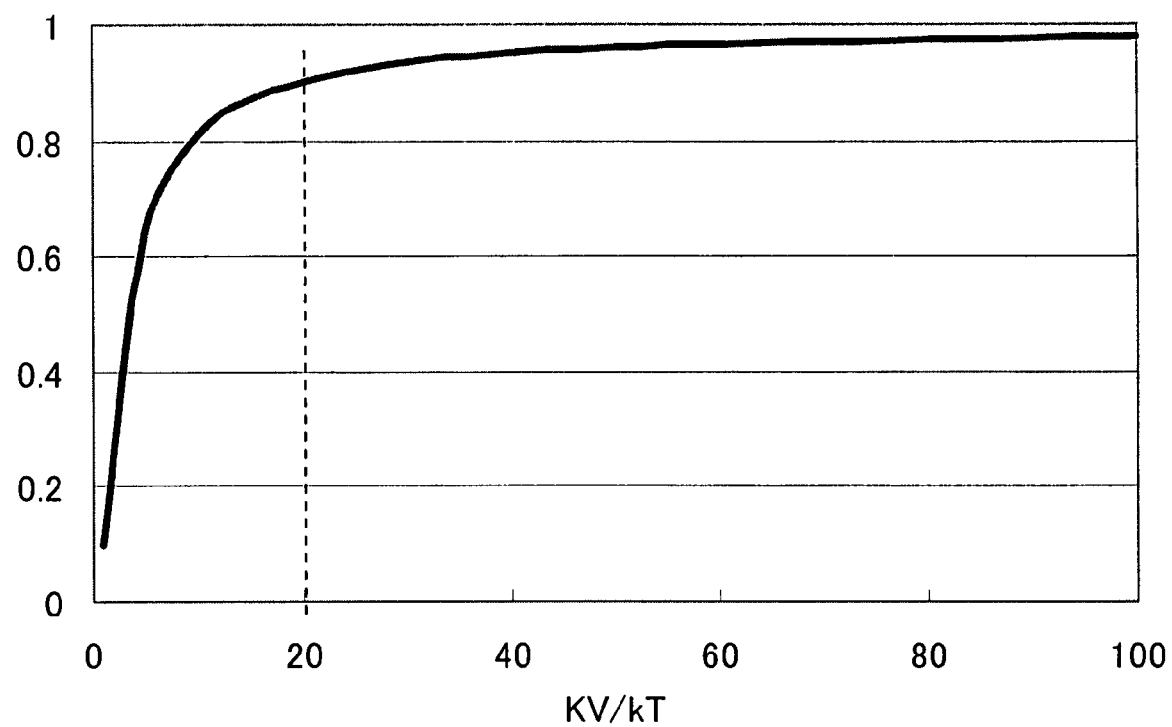
FIG. 12 is a graph showing the relation between magnetic energy and KV/kT.

To reduce the magnetic noise of the device, it is important that the volume of magnetic layers is made to be at least a certain volume. The magnetic noise is concerned with a large fluctuation of the magnetic film due to heat. Therefore, to reduce the magnetic noise, it is important that the energy of saturation magnetization, which is a main element to constitute static magnetic energy K (or E) is stabilized by heat. The relation between $M^2$, which is the energy of saturation magnetization, and KV/kT is calculated, and change in standardized M is shown in FIG. 12. Thereby, at least about 90% of $M^2$ is expressed when KV/kT>20, and $M^2$ is substantially stabilized against temperature modulation. The device structure that secures the film volume V to satisfy such conditions is essential.

FIG. 11 is a diagram showing another embodiment of the film structure of a magnetic free layer 104. Heretofore, although the magnetic free layer 104 has been described as a single magnetic body, a structure wherein the magnetic free layer 104 is multilayered by a plurality of magnetic layers 1101 and 1103 via an intermediate layer 1102 is also effective. The combination of the magnetic layers 1101 and 1103 is optional as long as materials specified as magnetic layer materials are used. The intermediate layer 1102 is normally composed of a material that attracts the coupling of a laminating ferri such as Ru. In an example, the magnetic layer 1101 is composed of NiFe, the intermediate layer 1102 is composed of Ru with a thickness of 0.85 nm, and the magnetic layer 1103 is composed of CoFe.

FIG. 11A shows an example wherein a magnetic free layer 104 is grown in parallel on the end portion of diagonally processed non-magnetic electrode layer 101 via a barrier layer 105. FIG. 11B shows an example wherein a magnetic layer 1103 is formed on the end portion of diagonally processed non-magnetic electrode layer 101 via a barrier layer 105, the end portion of the magnetic layer 1103 is processed so as to be substantially parallel to the surface of a medium, and a plurality of magnetic layers are formed via intermediate layers 1102 to form a magnetic free layer 104. In the magnetic free layer 104 of this form, magnetic layers are antiferromagnetically coupled to each other to weaken interlayer static magnetic coupling, and when magnetic energy is considered, the volume of the magnetic free layer 104 is increased because the volume becomes the sum of the volumes of all the films. Also since the behavior as a magnetic free layer is substantially determined by the front-end magnetic layer, an ideal magnetic free layer can be formed.

On the other hand, the property required to the non-magnetic electrode layer 101 is a long spin diffusion length. It is considered for this that the material having a very low resistance, or having a high conductivity of p electrons or d electrons, is effective. Therefore, non-magnetic conductive metals selected from a group consisting of Cu, Au, Ag, Pt, Al, Pd, Ru, C, Mg, Ir, and Rh, or conductive nonmagnetic compounds containing GaAs, Si, TiN, TiO, or $ReO_3$ as the main component, are effective. For example, when Cu is used, the spin diffusion length is increased by reducing the residual resistance of the Cu. The spin diffusion length of Ta(film thickness 3 nm)/Cu(film thickness 30 nm) formed on a $SiO_2$ substrate using an ultra high vacuum sputtering having an areal resistivity of 3 to 4 μΩ·cm is 300 to 500 nm, but when the areal resistivity is as low as 2 μΩ·cm, the spin diffusion length exceeds 700 nm. It is therefore important to select a material having a low or appropriate resistance and apply a processing method to reduce resistance as described above.

The examples of materials constituting the magnetic pinned layer 102 and the magnetic free layer 104 include Co, Ni, Fe, Mn, and alloys and compounds containing at least one of these elements as a main component. Normally, these have an fcc structure, and $Ni_{80}Fe_{20}$, $Co_{90}Fe_{10}$, having a good soft magnetism these materials whose contents of components are several percent shifted, and these materials containing Cr, Ni, or Co as an additional element can be considered.

Further as magnetic layers, films consisting of Fe having a bcc structure; alloy films having compositions represented by $Co_{50}Fe_{50}$; compounds containing Co—Fe alloy and B (CoFeB), Co—Fe alloy and C (CoFeC), and Co—Fe alloy and N (CoFeN) having amorphous structures; and combinations of these films heat-treated at a temperature range not lower than 100° C. and not higher than 400° C. can be applied to the magnetic layer at least in the magnetic free layer. It is particularly important that the magnetic free layer composed of these magnetic materials contacts the MgO intermediate layer. To magnetic materials of the magnetic free layer combined with the intermediate layer consisting of barrier layer materials other than MgO, the above-described materials, Heusler alloy such as CoFeCrAl or spinel compounds such as $Fe_3O_4$, which are magnetic materials known to have a large half metallic property can be applied.

As materials composing insulating layers 103 and 105, single films or laminated films consisting of materials containing at least one of $Al_2O_3$, AlN, $SiO_2$, $HfO_2$, $Zr_2O_3$, $Cr_2O_3$, MgO, $TiO_2$, and $SrTiO_3$ can be used. Particularly for the member composing the magnetic free layer, it is preferable to use crystalline MgO or crystalline $SrTiO_3$ in combination with the magnetic layers as described above.

These materials have been known to exert tunnel magnetic resistance effect as a TMR device. When 1 nm of a NiFe layer and 13 nm of MnPt layer are formed on a Ta/Cu/Ta film; 3 nm of a $(CoFe)_{60}B_{40}$ layer and 1 nm of a MgO layer are formed on a magnetic layer; and 3 nm of a $(CoFe)_{60}B_{40}$ layer is formed on a magnetic layer using high vacuum sputtering equipment; and these are heat-treated in a magnetic field at 270° C. in an external magnetic field of 6 kOe, a film whose magnetoresistive ratio at room temperature is 120% can be fabricated. It has been reported that a film whose magnetoresistive ratio at room temperature exceeding 200% can be fabricated by optimizing various conditions in film and device fabrication.

This is achieved because MgO grown on an amorphous film has favorable (100) orientation, and an ideal spin device wherein the spin electron conduction of the bcc magnetic material via MgO is extremely high reflecting a spin polarization ratio is formed. For example, when magnetic bodies have 100% magnetic resistance effect and consist of the same material, the spin polarization ratio becomes simply 58%.

When an antiferromagnetic material is used, the examples of films constituting an antiferromagnetic layer 801 include PtMn, CrMnPt, MnIr, NiO and PdPtMn. In these materials, unidirectional anisotropy significantly appears at least at critical film thickness determined for each composition of several nanometers to several ten nanometers and heat treatment in magnetic field under appropriate conditions, and is effective to fix the magnetization of magnetic pinned layer 102.

When a hard bias system that has been applied to general GMR read head is applied to the control of the magnetic domain of the magnetic free layer 104, by disposing permanent magnets used in hard bias on the both ends of the device film in the track-width direction via insulating films, fine magnetic domains generated on the end portions of the magnetic free layer in the device are decreased using stray field from the permanent magnets, and a magnetic domain structure arrayed in one direction can be formed. As another system to control the magnetic domain, permanent magnets are disposed on the magnetic free layer, or another major surface side of the magnetic free layer and the insulating layer contacting the magnetic free layer via a non-magnetic film. Other than these, as the structure of the film, by forming a multilayer film consisting of antiferromagnetic films and soft magnetic layers contacting the antiferromagnetic films, a system for aligning the magnetic domains of the magnetic free layer 104 using the stray field generated from the permanent magnets or the end portions of the soft magnetic layer (CFS (closed flux structure) system) is effective. Within a range wherein the device size is smaller than 1 μm×1 μm, significant lowering of the insulation property of the insulating film of the hard bias and the accuracy of the magnetic-domain controlling magnetic field is anticipated. In the region where the gap interval is shorter than 50 nm, although the thickness reduction causes problem, this system is promising as the future system, and is sufficiently effective in the film structure of the present invention.

Embodiment

A film of a device was formed on a commonly used substrate, such as a $SiO_2$ substrate and a glass substrate (including a magnesium oxide substrate, a GaAs substrate, an AlTiC substrate, a SiC substrate, an $Al_2O_3$ substrate, and the like) using a film forming method, such as in-vacuo sputtering and molecular beam epitaxy (MBE). For example, in the case of RF sputtering, the film was formed in an Ar atmosphere under a gas pressure of about 0.05 to 1 Pa and a power of 50 to 1000 W. As a base material on which the device was formed, the above-described substrate was directly used, or the substrate on which insulating films or suitable base metal films were formed was used.

Figure 10:
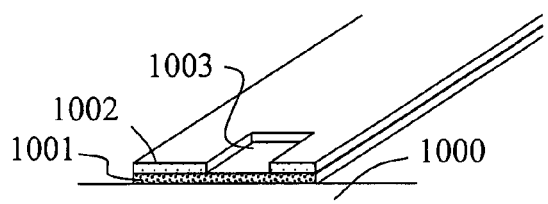
FIGS. 10A to 10G are diagrams showing an example of the fabrication process of a magnetic read head according to the present invention.
Figure 10:
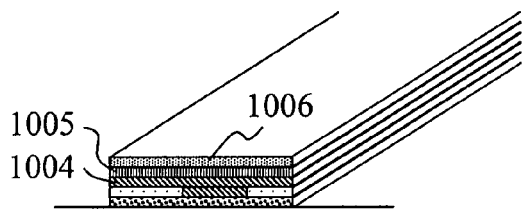
Figure 10:
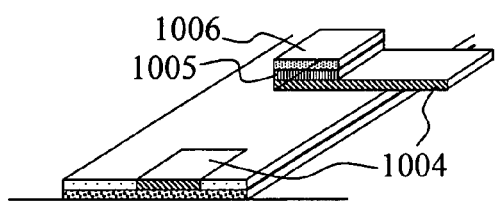
Figure 10:
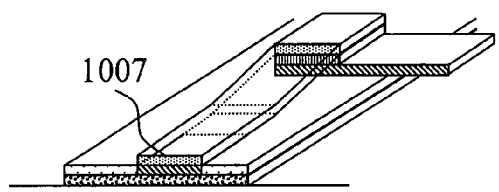
Figure 10:
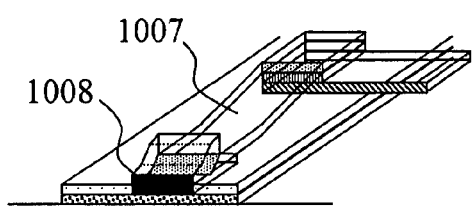
Figure 10:
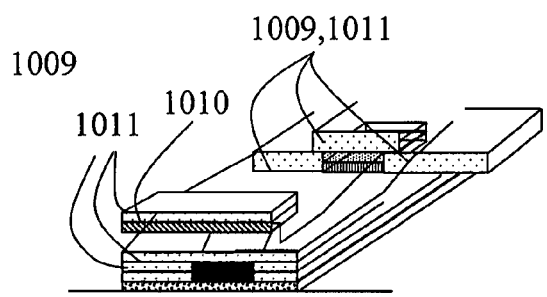
Figure 10:
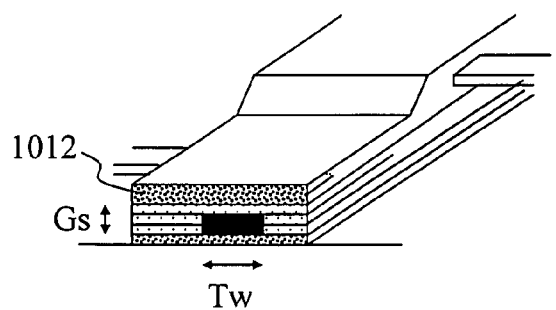

As an example, a method for fabricating a device wherein a magnetic pinned layer 102 contacts a non-magnetic electrode layer 101 via a barrier layer 103, and a magnetic free layer 104 is disposed between the non-magnetic electrode layer 101 and the substrate surface 301 represented by a device shown in FIG. 7B will be described. As shown in FIG. 10A, a lower shield 1001 and an insulating film 1002 are formed on a base material 1000, a photo-resist is applied, and the contact-hole pattern is formed using a lithography technique, such as electron beam drawing. The object of this step is to remove the insulating film 1002 on the area for forming a contact hole, and any pattern structure can be used as long as the object can be achieved. The area for the contact hole 1003 as shown in FIG. 10A was removed using argon ion milling or reactive ion etching (RIE). Here, as shown in FIG. 10B, an electrode film 1004 composed of Cu or the like, a laminated film 1005 constituting pinned layers and insulating films, and a non-magnetic film 1006 were formed. At this time, the electrode film 1004 has a shape to bury the contact hole 1003. Next, as shown in FIG. 10C, a resist is applied, and an electrode contact 1004 in a part of the magnetic pinned layer is processed using a lithography technique. Further, a pillar consisting of the film 1005 of the magnetic pinned layer and the film 1006 of the non-magnetic layer is processed.

Next, as shown in FIG. 10D, the surface is cleaned by in-vacuo radical ion shower or the like, and a non-magnetic film 1007 composed of the same material as the material for the film 1006 is formed by sputtering or the like. The non-magnetic film may be a multilayer film having a protective film on the outermost surface. A resist is applied to the non-magnetic film 1007, and a thin wire shape shown in FIG. 10D is fabricated by lithography. In this case, an insulating film may be formed on the entire surface after forming the nano-pillar, and the pillar 1006 may be exposed using a lift-off method. Furthermore, before forming the non-magnetic film 1007, a positive pattern having a thin wire shape may be formed by a resist using lithography technique such as electron beam drawing, and after cleaning the surface and forming the non-magnetic film 1007, the resist may be lift off.

Next, as shown in FIG. 10E, the portion of the fabricated non-magnetic thin wire 1007 in the vicinity of the ABS plane and contacting the contact hole was ground by equivalent lithography and processing method. At this time, by tilting the substrate on which the device has been formed, the cross section after processing becomes slanted. A magnetic free layer 1008 consisting of insulating films and magnetic films is formed here, and processed so that the track width Tw becomes correct. Thereby, a pillar-shaped pattern 1008 of the magnetic free layer can be formed. A liftoff pattern may also be used in the forming method. Next, as shown in FIG. 10F, a protective insulating film 1009 is formed in this state, and a contact hole is formed in a part of the pillar-shaped pattern 1008 of the magnetic free layer. Thereon, an electrode film 1010 is further formed, and thin wires for distribution are formed. Thereon, an insulating film 1011 is formed. Here, a shield-shape resist pattern was formed, and a magnetic film 1012 for upper shielding was fabricated. The magnetic film 1012 for upper shielding can also be fabricated even if the order of the resist film and the film.

From the point of view of films, as the structure of the magnetic free layer 1008, the following structure other than a simple magnetic film can also be considered. The main structure of the magnetic free layer is a structure wherein protective films, such as a Ta film (thickness: 3 nm), an antiferromagnetic film (thickness: 10 nm), a CoFe film (thickness: 3 nm)/a Ru film (thickness: 0.85 nm)/a CoFeB magnetic film (thickness: 3 nm), a MgO film (thickness: 2 nm), a Cu film (thickness: 10 nm), and a Ta film (thickness: 3 nm) are sequentially formed in a high vacuum. The film thicknesses in brackets are examples. In the structures of these magnetic films, the magnetic layer 1008 in FIG. 10E has a laminated ferri structure. The MgO film in the barrier layer 103 is directly grown. The same applies here to the case of using ZnO or SiTiO. When an alumina barrier layer is applied, an Al film is formed and oxidation treatment is performed. The method of oxidation used at this time is any of commonly used oxidation process, such as natural oxidation, plasma oxidation, radical oxidation, and ozone oxidation. A resist was applied to this film, and a pattern was drawn as a part of magnetic pillar-shape layers of 100 nm×100 nm (magnetic pinned layer) 102, 103, and 101 by lithography using an I-beam stepper or electron beams. When the length of a side was as thin as several hundred nanometers or thinner, since drawing has limitation by the wavelength resolution of I-beams, the pattern was drawn by an ArF stepper, a KrF stepper, or an electron-beam drawing method. The film was subjected to milling treatment using milling equipment of Ar ions to form the pattern. After cleaning the surface of the pillar in a vacuum, a Cu film and a protective film were further formed. A hole-shaped pattern was formed by applying a resist toward the pillar direction fabricated from the location facing the medium on the film surface, and the film is diagonally shaved using FIB. A film of an insulating material, such as MgO was formed thereon, a CoFeB magnetic layer was formed thereon, a protective film was fabricated, and a protective insulating film was formed. Thereafter, at the same time of the fabrication of thin wires in the non-magnetic electrode layer 101, the thin wire portion of the magnetic layer was shaved, a protective film was formed thereon to fabricate the magnetic free layer 104. Thereby, a magnetic layer wherein the front end portions of the thin wire pinch the barrier layer can be formed. Thereon a shield 901 is stacked as shown in FIG. 9A, or distributing wiring structure is formed on the front end as shown in FIG. 9B or FIG. 9C. For this, an electron drawing method, a stepper method, or a probe drawing method is used. When the hard bias film of the magnetic free layer is formed, a film of a permanent magnet such as CoCrPtZr is fabricated after forming the insulating film, and an insulating film is further formed. Thereafter, drawing for forming a Co line (magnetic pinned layer) 102 is performed, and a soft magnetic layer of Co or NiFe and an antiferromagnetic film of MnIr and the like are formed on the cleaned surface.

As another manufacturing method, a lower shield film 902 (see FIG. 9B) and an insulating film were formed on a base material for forming a device in a high vacuum, a non-magnetic electrode layer 101 composed of a Cu film was formed thereon, the pattern of the first electrode layer 101 was drawn by an electron beam drawing method and adjusted by a milling method, and the periphery of the thin wire filled with a protective insulating film. Thereafter, a resist was applied so as to open a window in the portion for forming a first magnetic layer, the surface of the portion was shaved, a Cu film 101, a barrier layer 103, a magnetic film (pinned layer) 102, an antiferromagnetic film and a protective film oxidation insulating film were additionally formed and lifted off to form the magnetic pinned layer 102. Thereafter, the portion to form a second magnetic layer was drawn with a resist, and the treatment for shaving was conducted with FIB. This hole opening operation can also be realized by adjusting the angle between the stage and Ar ions, and locally performing milling treatment using milling equipment. Thus, a conductive thin wire having a shape to be slanted at the end portion of the thin wire can be formed, and after in-situ surface cleaning, an insulating layer and a magnetic layer are formed thereon. This is lifted off, and the tip of the head can be fabricated by finely drawing the tip of the second magnetic layer and the vicinity facing the medium.

Furthermore, there also be a method wherein instead of diagonal shaving to the substrate surface as shown in FIGS. 6A to 6D, the conductive thin wire is shaved from the plane facing the medium in the depth direction as shown in FIG. 6E, and after cleaning the boundary, the barrier layer 103 and the magnetic free layer 104 are formed from the side of the plane facing the medium to form the film, and finally, the exposed plane is formed by polishing the plane facing the medium. According to this method, the cross-sectional structure of the magnetic free layer 104 becomes as shown in FIG. 11B. At this time, the examples of methods for shaving in the depth direction include any of milling, FIB, and wet etching.

Figure 14:
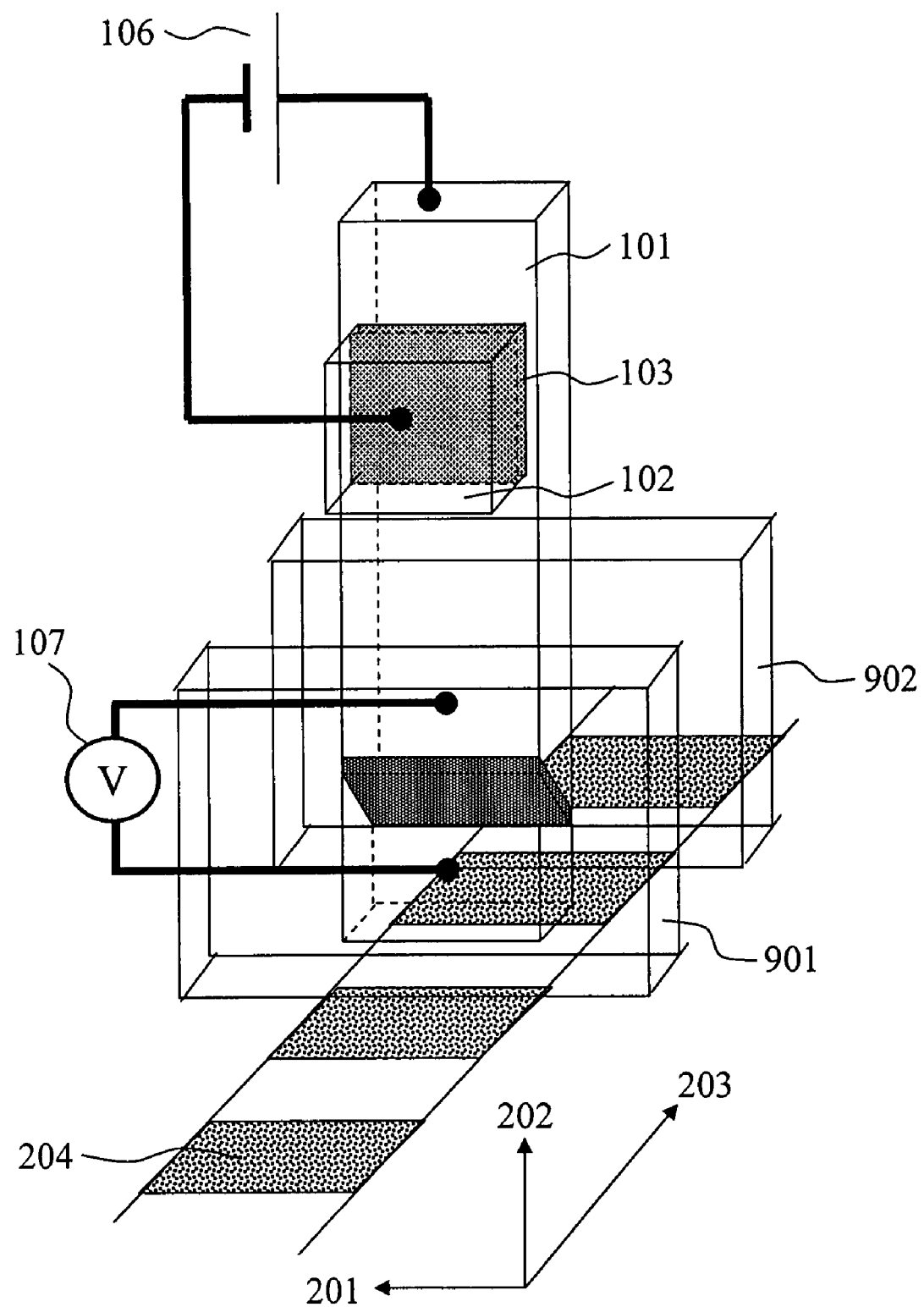
FIG. 14 is a diagram showing a circuit design of a magnetic read head of the present invention.

For the structure shown in FIG. 1, a representative example of the configuration of actually fabricated read head is shown in FIG. 14. The read head has a structure wherein a linear non-magnetic electrode layer 101 composed of Cu having a width of about 5 to 30 nm contacts a magnetic pinned layer 102 composed of a magnetic body via the first insulating layer 103 composed of $Al_2O_3$ formed on the conductor; and in the location 10 to 1000 nm apart from the non-magnetic electrode layer 101, a magnetic free layer 104 composed of CoFeB contacts the non-magnetic electrode layer 101 via an intermediate layer 105. A current source is connected to the first magnetic body 102 and the non-magnetic electrode layer 101 for flowing current. Furthermore, on the top and bottom surfaces in the film thickness direction of the base material for these elements, soft magnetic layers 901 and 902 having magnetic shield function are disposed via an insulating film. The magnetic read head is formed in a structure wherein a write head is positioned on the soft magnetic layer 901 to be an upper shield.

When the material of the non-magnetic electrode layer 101 is Co, the width is 30 nm, and the film thickness is 30 nm, the potential difference V generated between the magnetic free layer 104 and the thin Cu wire in the magnetoresistance sensor is experimentally about 2 mV when the current is 1.0 mA if magnetic noise is ignored. The volume of the magnetic film is $9 \times 10^{-24}$ $m^3$ when the length of the film in the device height direction is 10 nm and the shape of the magnetic free layer 104 is a rectangular parallelepiped. At this time, EV/kT is as large as about 5000. However, in a material of low magnetization or small anisotropy, EV/kT becomes about 1500. If the film thickness and the width are further miniaturized, the volume is reduced, and KuV/kT, approaches to 20 as shown in Table 1. Table 1 summarizes the volume at a temperature of 300K, and the relation between Ku/kT, and the volume of the magnetic layer for a NiFe material having magneto-static energy of $E = (2\pi Ms^2 + K) = 8.3 \times 10^5$ $J/m^3$, and CoFe, Co, and FePt of $E = 2.9 \times 10^6$ $J/m^3$, $E = 2.2 \times 10^6$ $J/m^3$, and $E = 1 \times 10^6$ $J/m^3$, respectively.

TABLE 1

| Element width × element height × film thickness | Volume of magnetic free layer V ($m^3$) | EV/kT Material: NiFe K = 1E3 J/m3 E = 8.3E5 J/m3 | EV/kT Material: CoFe K = 4.5E4 J/m3 E = 2.9E6 J/m3 | EV/kT Material: Co K = 4.5E5 J/m3 E = 2.2E6 J/m3 | EV/kT Material: FePt K = 1E6 J/m3 E = 1E6 J/m3 |
|---|---|---|---|---|---|
| 30 nm × 100 nm × 30 nm | 9.00E−23 | 18000 | 63000 | 48000 | 19100 |
| 30 nm × 50 nm × 30 nm | 4.50E−23 | 9100 | 32000 | 24000 | 9530 |
| 30 nm × 30 nm × 20 nm | 1.80E−23 | 3600 | 13000 | 9600 | 3810 |
| 30 nm × 30 nm × 10 nm | 9.00E−24 | 1800 | 6300 | 4800 | 1910 |
| 20 nm × 10 nm × 10 nm | 2.00E−24 | 400 | 1400 | 1100 | 424 |
| 10 nm × 10 nm × 10 nm | 1.00E−24 | 200 | 700 | 530 | 212 |
| 7 nm × 7 nm × 2 nm | 0.9E−25 | 20 | 69 | 52 | 20 |

Figure 13:
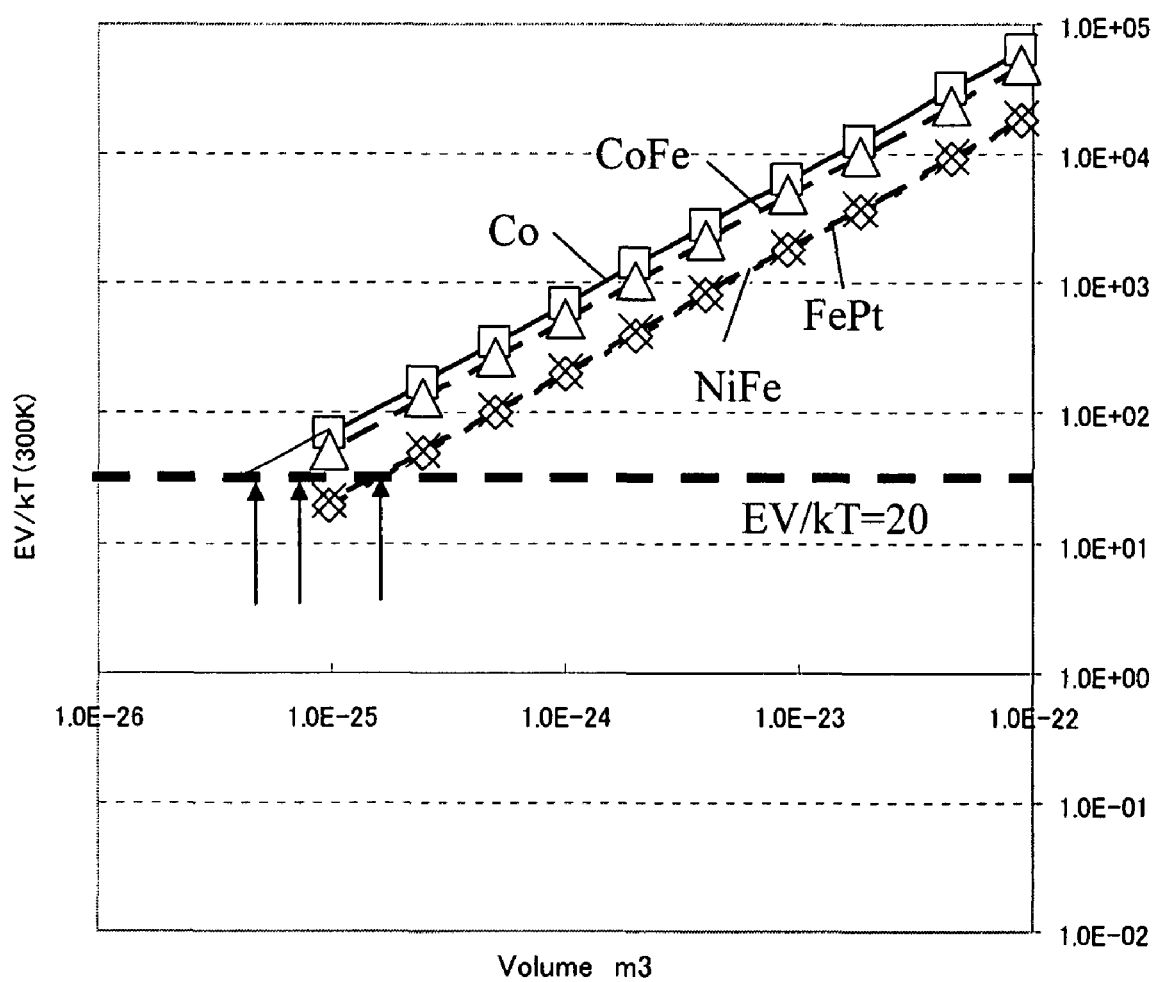
FIG. 13 is a graph showing the relation between the volume of a magnetic free layer and KV/kT.

At this time, with decrease in the volume, the operation energy of magnetization is sharply lowered as shown in FIG. 13. FIG. 13 shows change in Ku/kT for the volume of the film when materials of different Ku are used. The volume of the magnetic free layer that can be realized is reduced by elevating the density, and normally, the volume and KuV/kT are exponentially reduced responding to the reduction of the volume. In this case, the output is significantly varied by slight thermal fluctuation. This is the action of so-called magnetic noise.

To suppress magnetic noise, it is required that EV/kT is larger than 20 shown by the dotted line in FIG. 13, specifically, it is required that the volume V of the magnetic layer is secured to be at least a certain value. As shown in FIG. 12, if KuV/kT is 20 or less, intrinsic magnet moment decreases with increase in the fluctuation of magnetization. This shows that although the magnetic moment of an atom is constant, the effect of increase in fluctuation is large. Specifically, the condition of KuV/kT is 20 or less is the condition of a large effect of magnetic noise, which is a noise accompanying the fluctuation of magnetization.

However, there is limitation in the film thickness having a high relation with Gs (interval between shield gaps) because of the necessity to elevate resolution. In the head of 1 terabit/square inch class, the width of the thin wire must be 25 nm or less and the film thickness must also be 25 nm or less. At this time, in the shape wherein thin conductive wires and magnetic layers are laminated and continue to the plane facing the medium, if it is assumed that the film thickness of the magnetic layer is 12.5 nm, when calculated from the condition for exceeding 20 in the graph of the volume and KuV/kT, it is only required that the length is about 14 nm or more in the element height direction. However, in the head of 5 terabit/square inch, the width of the thin wire must be less than 10 nm, and the film thickness must be also less than 10 nm. At this time, the structure can be no longer maintained by the structure wherein the conductive films and magnetic layers are as laminated. Therefore, by forming a structure wherein a magnetic free layer contacts the conductive film at the portion in the film cross-sectional direction, and only the magnetic free layer is exposed on the plane facing the medium, the structure to extend the distance in the element height direction can be adopted, and the volume can be maximized. In this case, when calculated from the condition to exceed 20 in the graph of the volume and KuV/kT, the length in the element height direction may be a length of about 25 nm or more.

Figure 15:
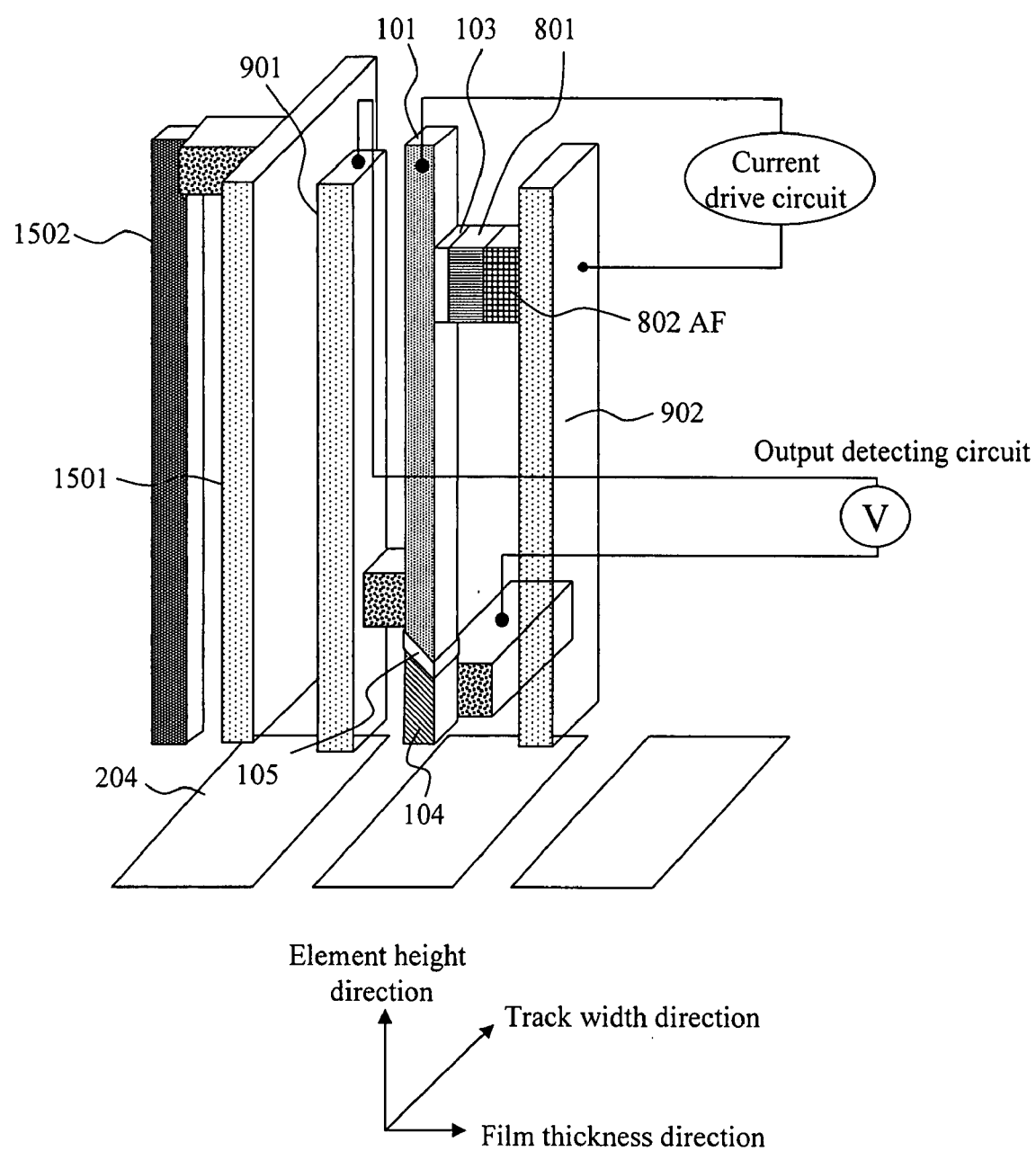
FIG. 15 is a diagram showing an example of the configuration of a combined head equipped with a magnetic read head and magnetic write head according to the present invention.

The structures shown in FIG. 1 and FIG. 15 are exemplified by the case of using CoFeB as the magnetic body. For the fabrication of the films, an ultra high vacuum sputtering film forming method using Ar gas at a substrate temperature of room temperature was used. The composition ratio of CoFe and B was 6:4 to 8:2, and the composition ratio of Co and Fe was 1:1 to 3:1. At this time, the crystalline structure of the film fabricated at room temperature was in a state called amorphous. CoFe—X compounds such as CoFeC, CoFeN and the like have also amorphous crystalline structures in the same composition ratio. An MgO film was formed on this film. For the fabrication, a MgO target was used, and in the same manner as described above, an ultra high vacuum sputtering film forming method using Ar gas was applied. The thickness of the MgO film was 0.6 to 2.5 nm. The MgO insulating film formed on the amorphous film has (100) orientation. When an element having an element area of 1 μm×1 μm was fabricated using a structure wherein a CoFeB film was formed thereon in the same manner, a film such as an antiferromagnetic film and the like was formed thereon, and magnetoresistive ratio was measured, it showed TMR of about 100% at room temperature. The structure is further subjected to heat treatment at a temperature between 300° C. and 400° C. to form a film showing a TMR of 250% or more at room temperature. At a temperature of 400° C. or higher, other alloy films are damaged. At this time, the magnetic layers and the barrier layers are crystallized, and the state can be observed from cross-sectional TEM photography. The characteristics include the property wherein current-voltage characteristics are different between the parallel and antiparallel magnetization states. In this case, the barrier is effective in an antiferromagnetic state, and the barrier height is 0.2 to 0.5 eV. This is as low as half the barrier height of aluminum oxide (0.8 to 1.4 eV). Furthermore, substantially linear I-V characteristics are observed in the parallel state, and substantially metallic behavior is shown. Therefore, the application of MgO, CoFeB, and similar system to the element is very effective in addition to the specifying of the electrode location for noise reduction described before.

The magnetic materials for the magnetic free layer to be combined with the intermediate layer composed of specified barrier layer materials other than MgO are not CoFeB, but the above-described many magnetic materials having a large half metallic effect are applied. At this time, the materials for composing the intermediate layer are characterized as single films or laminated films composed of materials containing at least one selected from a group consisting of $Al_2O_3$, AlN, $SiO_2$, $HfO_2$, $Zr_2O_3$, $Cr_2O_3$, MgO, $TiO_2$, and $SrTiO_3$. Particularly for the site to composing the magnetic free layer, the use of crystalline MgO or crystalline $SrTiO_3$ in the combination with the magnetic layer is characterized as described above. For example, in the case of $SrTiO_3$, the barrier height is about 0.05 to 0.1 eV.

FIG. 15 shows the structure of a head of the present invention. The positional relation between the read head portion and the medium is same as those shown in FIGS. 4 and 5. In FIG. 15, the case wherein a kind of vertical recording head is mounted as the recording head is shown. On a soft magnetic layer 901 to become the upper magnetic shield of the read head, a return yoke with recording shield 1501 is provided, and a magnetic pole for recording 1502 is disposed thereon. As the material for the recording head, a material having a high saturation flux density (2.0 T or higher) and a suitably high resistivity is suited. The recording head structure according to the present invention can utilize an optional present technique, and can fabricate a head structure as a combination. There is no functional change in read density by the head structure of the present invention.

Figure 16:
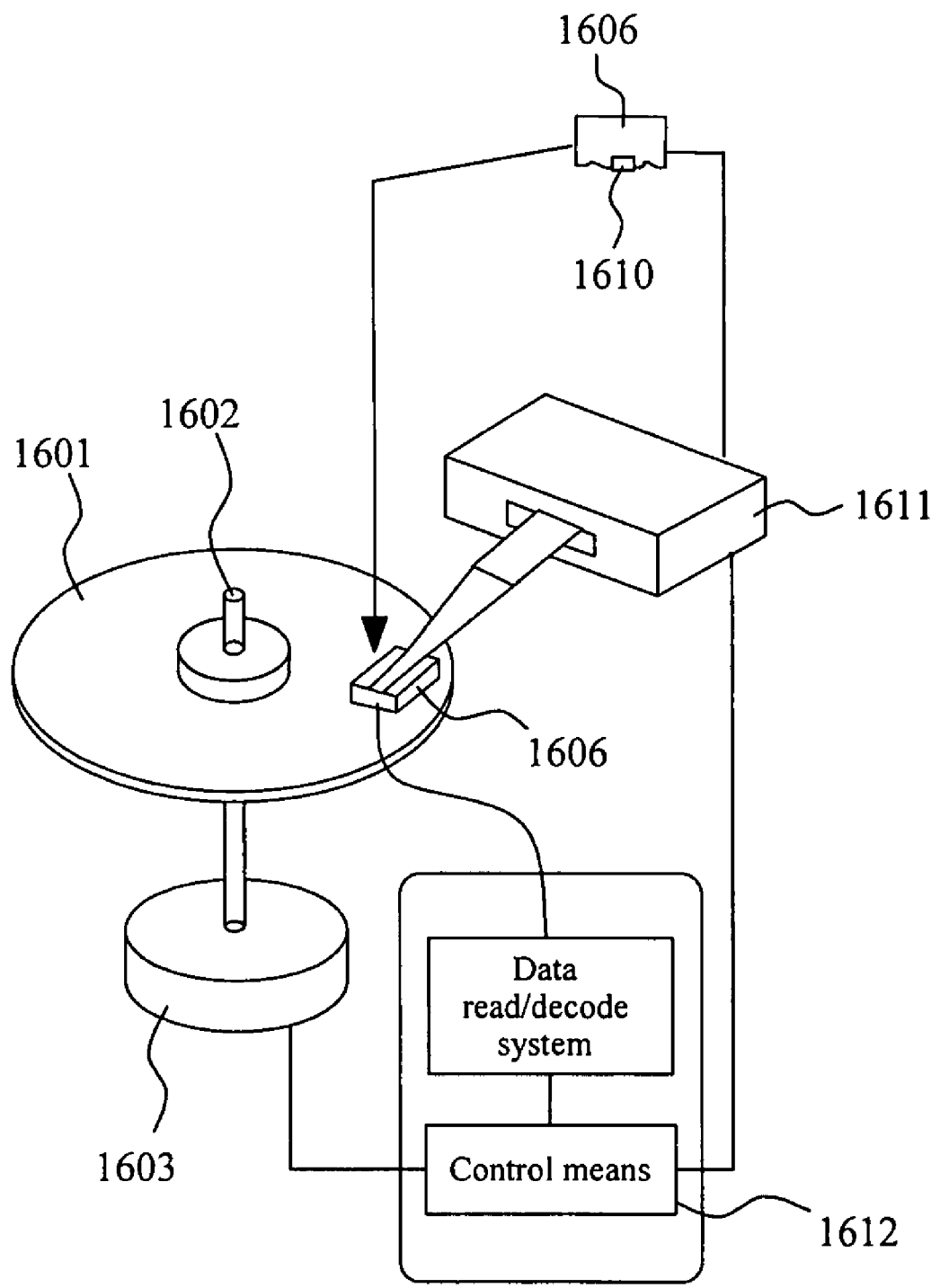
FIG. 16 is a schematic diagram showing a magnetic read-write system according to the present invention.

FIG. 16 is a schematic diagram showing a magnetic disk system using a head according to the present invention. The magnetic disk system shown in FIG. 16 has a magnetic disk 1601 as a magnetic recording medium, a slider 1606 on which a magnetic head 1610 according to the present invention for conducting read and write of data is mounted, an actuator 1611 for moving the magnetic head 1610 to a specified position on the magnetic disk 1601, and control means 1612 for controlling the sending and receiving of the data to be read and written by the magnetic head and the movement of the actuator. The rotatable magnetic disk 1601 is supported by a rotating shaft 1602, and rotated by a driving motor 1603. At the same time of the rotation of the magnetic disk 1601, a slider 1606 moves on the surface of the disk and is accessed to the predetermined position where target data is recorded. The control means 1612 sends and receives control signals through each line, and controls various components of the magnetic disk system.

By mounting the magnetoresistance effect elements according to the present invention on the magnetic read write system, magnetic read and write in the region exceeding a read density of 1000 $Gb/in^2$ become feasible.

What is claimed is:

1. A magnetic read head, comprising:
   a non-magnetic electrode layer having a medium-facing surface;
   a magnetic pinned layer formed on said non-magnetic electrode layer via a first insulating layer, said magnetic pinned layer having a medium-facing side and an anti-medium-facing side;
   a magnetic free layer formed on the medium-facing surface of said non-magnetic electrode layer via a second insulating layer, the magnetic free layer being spaced below and laterally to the side of the magnetic pinned layer, said magnetic free layer having a medium-facing side and an anti-medium-facing side;
   a circuit for flowing current between said non-magnetic electrode layer and said magnetic pinned layer via said first insulating layer; and
   a circuit for measuring voltage between said non-magnetic electrode layer and said magnetic free layer,
   wherein a medium-facing edge of said magnetic free layer is formed below, and to a lateral side of, the medium-facing side of the magnetic pinned layer.

2. The magnetic read head according to claim 1, wherein a magnetic shield is formed so as to pinch at least said magnetic free layer.

3. The magnetic read head according to claim 2, wherein said magnetic shield has electrical conductivity, and forms a part of said circuit for flowing current and/or said circuit for measuring voltage.

4. The magnetic read head according to claim 1, wherein said medium-side surface of the non-magnetic electrode is a plane substantially parallel to a surface of the medium.

5. The magnetic read head according to claim 1, wherein said medium-side surface of the non-magnetic electrode is a plane tilted from a surface of the medium.

6. The magnetic read head according to claim 1, wherein a film having an action to pin the magnetization of said magnetic pinned layer to a plane opposite to a plane contacting said first insulating layer is formed on said magnetic pinned layer.

7. The magnetic read head according to claim 1, wherein said magnetic free layer is a multilayer film formed by alternately laminating metal films and magnetic films.

8. The magnetic read head according to claim 1, wherein the product of the magneto-static energy, calculated from the saturation magnetization and the magnetic anisotropy of said magnetic free layer, and the volume of said magnetic free layer is at least 20 times the thermal energy at a normal temperature represented by an absolute temperature multiplied by the Boltzmann factor.

9. A magnetic read write system, comprising:
a magnetic recording medium, a medium driving unit for driving said magnetic recording medium, a magnetic head performing read and write operations to said magnetic recording medium, and a magnetic head driving unit for driving said magnetic head to a desired location of said magnetic recording medium;

wherein said magnetic head comprises a non-magnetic electrode layer having a medium-facing surface, a magnetic pinned layer formed on said non-magnetic electrode layer via a first insulating layer, a magnetic free layer formed on the medium-facing surface of said non-magnetic electrode layer via a second insulating layer, the magnetic free layer being spaced below and laterally to the side of the non-magnetic electrode layer, a circuit for flowing current between said non-magnetic electrode layer and said magnetic pinned layer via said first insulating layer, and a circuit for measuring voltage between said non-magnetic electrode layer and said magnetic free layer;

wherein a medium-facing edge of said magnetic free layer is formed below, and spaced to a lateral side of, a medium-facing side of said magnetic pinned layer.

* * * * *